United States Patent Office 3,652,749
Patented Mar. 28, 1972

3,652,749
CONTINUOUS DRAWING OF FIBERS FROM A MIXTURE CONTAINING AN INORGANIC OXIDE SOL COVERED BY A PROTECTIVE FLUID
Jay E. Sobel, Des Plaines, and John C. Foley, Waukegan, Ill., assignors to Universal Oil Products Company, Des Plaines, Ill.
No Drawing. Filed Jan. 26, 1970, Ser. No. 5,916
Int. Cl. D01d 5/04, 1/02; C04b 35/10
U.S. Cl. 264—63
18 Claims

ABSTRACT OF THE DISCLOSURE

A method of preparing refractory inorganic oxide fibers. A refractory inorganic oxide sol, e.g., an alumina sol, is admixed with a soluble fiber-forming organic polymer, e.g. (a polyethylene oxide). This mixture after being concentrated to a viscosity of 1–3000 poises, is covered with a water immiscible and moderately volatile liquid, e.g., n-hexane, after which fibers are drawn up from the mixture. The organic matter is thereafter burned from the fibers which are calcined at 300–1000° C. The fiber forming mixture may also contain a soluble organic amine. The layer of water immiscible liquid permits continuous fibers to be drawn from the concentrated mixture without breaking which has been a problem in the prior art. After the fibers are drawn the layer of water immiscible liquid remaining on their surfaces vaporizes.

BACKGROUND OF THE INVENTION

This invention relates to a method of preparing refractory inorganic oxide fibers. Such fibers have heretofore been recognized as insulators against heat and sound, and as fillers, stiffening agents or tensile and abrasion reinforcing agents for plastics, films, and the like. The refractory inorganic oxide fibers of this invention are flexible fibers capable of being formed into multiple filament yarns and flexible textiles and mats. They are characterized as porous fibers of high surface area and are advantageously employed as a catalyst, or as a catalyst support, for a variety of reactions, including hydrocarbon conversion reactions and, in particular the treatment of combustible waste gases prior to discharge of the same into the atmosphere. For example, the fibers of this invention are particularly adapted for incorporation in a catalytic muffler as a catalyst or component thereof to effect the elimination of the products of incomplete combustion from hydrocarbonaceous waste gases emanating from an internal combustion engine prior to discharge to the atmosphere.

It is an object of this invention to provide a novel refractory inorganic oxide fiber material, and a method of preparation. It is a further object to present a novel method of preparation whereby porous flexible fibers of high surface area, capable of functioning as a catalyst or a component thereof, are produced by an updrawing procedure.

SUMMARY OF THE INVENTION

In one of its broad aspects, the present invention embodies a method of preparing refractory inorganic oxide fibers which comprises, forming a substantially liquid phase reaction mixture comprising a refractory inorganic oxide sol and a soluble fiber-forming organic polymer, concentrating said mixture while maintaining substantially liquid phase conditions, covering said mixture with a layer of water immiscible liquid, drawing fibers up from said concentrated reaction mixture, burning the organic matter therefrom, and calcining the resulting fibers at a temperature of at least about 300° C.

The fibers may be drawn up from the concentrated reaction mixture in an atmosphere characterized by a relative humidity of less than about 80% and a temperature of from about 5° to about 90° C., but are preferably drawn up in an atmosphere characterized by a relative humidity of from about 0% to about 60% and a temperature of from about 25° to about 50° C.

Preferably, the water immiscible liquid is of a sufficiently volatile type to thus permit rapid evaporation after the fiber is drawn up from the concentrated reaction mixture. The rate of evaporation is effected by such factors as the vapor pressure and boiling point of the liquid, the degree of saturation of the immiscible liquid in the atmosphere, the actual temperature of the liquid, movement of the atmosphere, etc. Under the atmospheric conditions as set forth above and assuming adequate renewal of the atmosphere to prevent saturation, the preferred boiling point for the water if miscible liquid is from about 25° to about 155° C. at standard conditions. Of course, for the lower temperature atmospheric conditions, the water immiscible liquid should have a lower boiling point.

The liquid should be sufficiently immiscible so as not to degrade the quality of the reaction mixture, and it should form a distinct layer above the mixture. Water immiscible liquids falling within the low boiling point range include the low boiling hydrocarbons, for example, pentane, hexane, heptane, octane, and the like, as well as some of the halogenated hydrocarbons, such as 1,1,1-trichloroethane, 2,2-dichloropropane, 1,1,1,2-tetrachloropropane, 1,1,1-trichloropropane, the azeotrope of 1,1,2-trichloro-1,2,2-trifluoroethane and dichloromethane sold under the trademark Freon TMC, and the like.

Other objects and embodiments of this invention will become apparent in the following detailed specification.

The refractory inorganic oxide sol utilized in accordance with the method of this invention includes gellable hydrous sols, for example alumina sol, chromia sol, zirconia sol, silica sol, magnesia sol, thoria sol, and the like, as well as combinations thereof, such as alumina-chromia sols, alumina-zirconia sols, etc., to form the corresponding refractory inorganic oxide fibers. Said sols include those sols resulting from hydrolysis and concentrations of aqueous solutions of one or more appropriate salts, such as zirconium acetate, whereby a colloidal dispersion, stable in the remaining liquid, is formed. For purposes of illustration, the method of this invention will be described with reference to the preparation of alumina fibers but with the understanding that the method is also applicable to the preparation of fibers comprising other inorganic oxides or combinations thereof. The alumina sols herein contemplated can be prepared by the hydrolysis of a suitable acid salt of aluminum such as aluminum chloride, aluminum sulphate, aluminum nitrate, aluminum acetate, etc., in aqueous solution, and treating said solution at conditions to form an acid anion deficient solution or sol. Reduction in the concentration of the acidic anion formed by the hydrolysis reaction may be accomplished in any conventional or otherwise convenient manner. Thus, the acid anion concentration can be reduced by utilizing aluminum metal as a neutralizing agent. In this case, the salt of neutralization is an aluminum salt subject to hydrolysis in ultimate sol formation. In some cases, as in the case of aluminum acetate, when the acid anion is sufficiently volatile, the desired acid anion deficient solution or sol may be prepared simply by heating. Another method of producing a suitable alumina sol is in the electrolysis of an aluminum salt solution, such as an aqueous aluminum chloride solution, in an electrolytic cell having a porous partition between anode and cathode whereby an anion deficient alminum salt solution, or sol, is recovered from the cathode compartment.

Preferably, the sol is an aluminum chloride sol prepared, for example, by digesting aluminum pellets or slugs in aqueous hydrochloric acid and/or aluminum chloride solution—usually at about reflux temperature. Aluminum chloride sols are preferably prepared to contain aluminum in from about a 1:1 to about a 2:1 atomic ratio with the chloride anion.

Pursuant to the present invention, a substantially liquid phase reaction mixture is formed comprising the described sol and a soluble fiber-forming organic polymer. The selected polymer must be substantially stable at fiberizing conditions, i.e., a temperature of from about 5° to about 90° C. The soluble, fiber-forming, organic polymers as herein contemplated include the modified natural products prepared as water-soluble derivatives of naturally occurring, fiber-forming, organic polymers or resins. Thus, the soluble, fiber-forming organic polymer can be a starch derivative such as a starch acetate, hydroxyethyl starch ether, amine starches, etc., or a soluble cellulose derivative, for example, the alkyl and hydroxyalkyl cellulose derivatives like methylcellulose, ethylcellulose, ethylmethylcellulose, hydroxyethylcellulose, hydroxyethylmethylcellulose, hydroxypropylmethylcellulose, ethylhydroxyethylcellulose, etc., and also water-soluble derivatives such as carboxymethylcellulose, carboxymethylhydroxyethylcellulose, and the like. Preferaby, the soluble, fiber-forming, organic polymer is a synthetic product such as the soluble polyalcohols, polyacids, polyimines, polyethers and polyamides, derived from the variety of synthetic monomers. Suitable synthetic organic polymers include the soluble polyvinylalcohols, polyurethanes, polyacrylic acid salts, polyacrylamides, polyvinylmethyl ethers, polyvinylpyrrolidones, polyethylene oxides, and the like. Since the organic polymer is expended in the fiber making process, it is desirable to utilize a minimum amount commensurate with a desired fiber product quality. Suitably, the organic polymer may comprise from about 0.5 to about 25 wt. percent of the reaction mixture although larger amounts can be used. The inclusion of a soluble, fiber-forming, organic polymer in the refractory inorganic oxide sol imparts an added cohesiveness thereto which enables the sol to be drawn or stretched into longer, finer fibers or filaments of an orderly molecular arrangement or orientation before the sol sets to a gel.

A third ingredient may be included in the reaction mixture, that being a soluble organic amine substantially stable at the fiberizing conditions. The addition of this amine should not be considered limiting upon the present invention, however, it may be desirous for certain consistencies of inorganic refractory fibers. The selected organic amine as mentioned must be substantially stable at fiberizing conditions, i.e., a temperature of from 5° to about 90° C. yielding basic nitrogen upon subsequent disposition at calcining temperatures. Suitable organic amines thus include n-butylamine, n-amylamine, sec-amylamine, t-amylamine, ethylenediamine, trimethylenediamine, tetratrimethylenediamine, pentamethylenediamine, hexamethylenediamine, hexamethylenetetramine, benzylamine, benzenetriamine, phenylenediamine, pyrrolidone, urea, etc., and also alkanolamines, such as ethanolamine, diethanolamine, triethanolamine, 2-amino-2-methylpropanol, 2-amino-butanol, and the like. The reaction mixture is suitably prepared to contain sufficient organic amine to effect from about 5% to about 50% neutralization of the acid anion retained in the sol upon subsequent calcination of the fiber product. It is preferred to add the selected organic amine as an aqueous solution into the sol to obviate localized gelation.

The reaction mixture or sol prepared from either the sol and polymer or from the sol, polymer, and amine is concentrated to a tacky consistency while maintaining a substantially liquid phase. The reaction mixture is suitably reduced to the desired consistency by the evaporation of water therefrom, suitably by simple evaporation upon standing or upon stirring in an open vessel, but more conveniently, by treating in a vacuum evaporator at ambient temperature, a tacky consistency being achieved at a viscosity of from about 1 to about 3000 poises. The further evaporation of water and initial gelation of the sol is effected as the concentrated reaction mixture is being drawn into stable fibers in an atmosphere of controlled temperature and humidity.

Fiberizing conditions relate principally to the temperature and humidity of the environment in which the fibers are formed. The relatively large surface area presented by the fibers and the process of being formed permits a relatively rapid evaporation of moisture therefrom with the formation of a stable fibrous hydrogel, provided that the moisture content of the environment is sufficiently low. If however, the moisture is too high, the desired rapid evaporation does not occur and the fibrous hydrosol may in effect absorb sufficient moisture to collapse in a formless mass. The fiberizing environment should comprise a relatively humidity of less than 80%, and preferably a relative humidity of from about 0% to about 60%. The temperature of the fiberizing environment is somewhat less critical and may be from 5° to about 90° C., and preferably from about 25° to about 50° C.

The described reaction mixtures are processed or formed to fibers by a slow and constant injection of the concentrated reaction mixture into an atmosphere of controlled humidity and temperature, by drawing the injected mixture upwardly from the reaction mixture into fibers and subjecting the fibers thus formed to a specific heat treatment to yield a porous, flexible product. Typically, the fibers are drawn vertically from the reaction mixture and wound continuously on a rotating drum. To successfully carry out this drawing and spinning of fibers, it is necessary to cover the reaction mixture with a coating of a liquid which is immiscible with the reaction mixture and which is sufficiently volatile so that it vaporizes off the fibers rapidly after they are drawn through it. The layer of immiscible liquid is necessary for it prevents evaporation at the surface of the reaction mixture and premature setting of the mixture, which leads to crusting and breaking of the fibers. Suitable liquids that have the quality of immiscibility and sufficient volatility comprises the aforementioned low boiling hydrocarbon liquids, for example, pentane, hexane, heptane, octane, and the like. Other such liquids include the low boiling water immiscible halogenated hydrocarbons such as 1,1,1-trichloroethane, 2,2-dichloroproane, 1,1,1,2 - tetrachloropropane, 1,1,1-trichloroprane, the azeotrope of 1,1,2-trichloro-1,2, 2-trifluoroethane and dichloromethane sold under the trademark Freon TMC, and the like. The reaction mixture is thus drawn through his layer of immiscible liquid and as the fibers are stretched the volatile liquid coating the fibers will evaporate. The reaction mixture is preferably drawn into fibers with a maximum diameter of less than about 20 microns for improved flexibility.

Fibers thus formed are thereafter calcinated preferably in air, at temperatures of at least about 300° C., and preferably at a temperature of from about 300° C. to about 1000° C., whereby the organic matter is burned from the fibers and a flexible refractory inorganic oxide product is recovered.

The following examples are presented in illustration of the method of this invention and are not intended as an undue limitation on the generally broad scope of the invention as set out in the appended claims.

EXAMPLE 1

To 95 parts by weight of alumina sol, prepared by digesting aluminum metal under reflux conditions, is added 5 parts by weight polyethylene oxide of molecular weight 600,000. This is then mixed until the polymer is uniformly dispersed, and evaporation of water under ambient conditions has increased the viscosity to greater than 200,000 centipoise. This mixture is then put into an evacuated chamber and deaerated until it appears clear. At this point the mixture is ready for fiberizing. This process is carried out at 25°–30° C. in a chamber having a relatively humidity of 40%–45%, drawing a fiber up out of the reaction mixture, which is then wound on a rotating drum. Under these conditions a fiber can be drawn for periods up to several minutes before the fiber breaks from no apparent cause. This breakage rate increases as the reaction mixture sits open to the fiberizing atmosphere, until it becomes impossible to draw fibers after exposure of 24 hours as the reaction mixture becomes encrusted. Calcining was not attempted with this sample.

EXAMPLE 2

The reaction mixture of Example 1 is covered with a layer of n-hexane prior to fiberizing it. It is then possible to draw fibers for extended periods of time up to several hours without breakage, and moreover the reaction mixture shows no long term crusting as was previously noted, and fibers could be drawn from reaction mixtures that had been exposed for periods in excess of two weeks. The fibers are then calcined for about one hour at about 550° C., to burn the organic matter therefrom, and to convert the structure of the same. The resulting fibers are flexible and resilient having a mean diameter of about 6 microns.

EXAMPLE 3

The reaction mixture of Example 1 is covered with a layer of n-pentane prior to fiberizing it, after which, fibers are drawn from the reaction mixture without breakage and without the effects of long term crusting. The fibers are then calcined at about 550° C. to burn the organic matter therefrom and to convert the structure of the same.

EXAMPLE 4

The reaction mixture of Example 1 is covered with a layer of n-octane prior to fiberizing it, after which, fibers are drawn from the reaction mixture without breakage and without the effects of long term crusting. The fibers are then calcined at about 550° C. to burn the organic matter therefrom and to convert the structure of the same.

EXAMPLE 5

The reaction mixture of Example 1 is covered with a layer of n-heptane prior to fiberizing it after which fibers are drawn from the reaction mixture without breakage and without the effects of long term crusting. The fibers are then calcined to about 550° C. to burn the organic matter therefrom and to convert the structure of the same.

The reaction mixture of Example 1 is covered with a layer of 1,1,1-trichloroethane prior to fiberizing it, after which, fibers are drawn from the reaction mixture without breakage and without the effects of long term crusting. The fibers are then calcined at about 550° C. to burn the organic matter therefrom and to convert the structure of the same.

EXAMPLE 7

The reaction mixture of Example 1 is covered with a layer of Freon TMC prior to fiberizing it, after which, fibers are drawn from the reaction mixture without breakage and without the effects of long term crusting. The fibers are then calcined at about 550° C. to burn the organic matter therefrom and to convert the structure of the same.

EXAMPLE 8

To the reaction mixture comprising 95 parts alumina sol and 5 parts polyethylene oxide is added sufficient hexamethyltetramine to neutralize 50% of the anion. This reaction mixture is stirred and allowed to evaporate under ambient conditions to a viscosity in excess of 200,000 centipoise. It is then deaerated under vacuum and fiberized by updrawing after covering the mixture with a layer of n-hexane. The fibers after calcination are strong, flexible, and have a surface area in excess of 200 $M^2/gm$.

We claim as our invention:

1. A method of preparing refractory inorganic oxide fibers which comprises:
    (a) forming a substantially liquid phase reaction mixture comprising a refractory inorganic oxide sol and a soluble fiber-forming organic polymer with the latter being present in an amount within the range of 0.5% to about 25% by weight of said reaction mixture;
    (b) Concentrating said reaction mixture to a viscosity within the range of about 1 to about 3000 poises while maintaining substantially liquid phase conditions;
    (c) covering said concentrated reaction mixture with a layer of water immiscible liquid selected from the group consisting of a low boiling hydrocarbon and a halogenated hydrocarbon;
    (d) drawing fibers up from said concentrated reaction mixture in to an atmosphere characterized by a relative humidity of less than about 80% and a temperature of from about 5° to about 90° C.;
    (e) and calcining the resulting fibers at a temperature of at least about 300° C. whereby the organic matter is burned from the fibers and a flexible refractory inorganic oxide product is recovered.

2. The method of claim 1 further characterized in that said concentrated reaction mixture is fiberized in an atmosphere characterized by a relative humidity of from about 0% to about 60% and a temperature from about 25° to about 50° C.

3. The method of claim 1 further characterized in that said substantially liquid phase reaction mixture further includes a soluble organic amine substantially stable at fiberizing conditions.

4. The method of claim 3 further characterized in that said organic amine is hexamethylenetetramine.

5. The method of claim 1 further characterized in that said inorganic oxide sol is an alumina sol.

6. The method of claim 1 further characterized in that said inorganic oxide sol is a chromia-alumina sol.

7. The method of claim 1 further characterized in that said inorganic sol is an aluminum chloride sol characterized by an aluminum/chloride atomic ratio of from about 1:1 to about 2:1.

8. The method of claim 1 further characterized in that said fibers are calcined at a temperature of from about 300° to about 1000° C.

9. The method of claim 1 further characterized in that said fiber-forming organic polymer is polyethylene oxide.

10. The method of claim 1 further characterized in that said water immiscible liquid has a boiling point from about 25° C. to about 155° C. at standard conditions.

11. The method of claim 10 further characterized in that said water immiscible liquid is a low boiling hydrocarbon.

12. The method of claim 11 further characterized in that said low boiling hydrocarbon is n-hexane.

13. The method of claim 11 further characterized in that said low boiling hydrocarbon is n-heptane.

14. The method of claim 11 further characterized in that said low boiling hydrocarbon is n-octane.

15. The method of claim 11 further characterized in that said low boiling hydrocarbon is n-pentane.

16. The method of claim 10 further characterized in that said immiscible liquid is a halogenated hydrocarbon.

17. The method of claim 16 further characterized in that said halogenated hydrocarbon is 1,1,1-trichloroethane.

18. The method of claim 10 further characterized in that said immiscible liquid is the azeotrope of 1,1,2-trichloro-1,2,2-trifluoroethane and dichloromethane.

(References on following page)

References Cited

UNITED STATES PATENTS

| | | | |
|---|---|---|---|
| 2,886,404 | 5/1959 | Teja | 18—54 |
| 2,919,996 | 1/1960 | Teja | 106—74 |
| 3,082,099 | 3/1963 | Beasley | 106—39 |
| 3,087,902 | 4/1963 | Teja | 260—4 |
| 3,180,741 | 4/1965 | Wainer et al. | 106—39 |
| 3,270,109 | 8/1966 | Kelsey | 264—178 |
| 3,271,173 | 9/1966 | Lockhart | 106—65 |
| 3,311,689 | 3/1967 | Kelsey | 264—210 |
| 3,475,375 | 10/1969 | Yates | 264—63 |
| 3,503,765 | 3/1970 | Blabe, Jr. | 106—65 |
| 3,529,044 | 9/1970 | Santangelo | 264—29 |

FOREIGN PATENTS

| | | | |
|---|---|---|---|
| 624,743 | 8/1955 | Canada | 264—164 |

JULIUS FROME, Primary Examiner

J. H. MILLER, Assistant Examiner

U.S. Cl. X.R.

23—345; 264—DIG. 19, 164, 165, 0.5